United States Patent
Kishimoto et al.

(10) Patent No.: US 11,638,973 B2
(45) Date of Patent: May 2, 2023

(54) SILVER BRAZING MATERIAL AND JOINING METHOD USING THE SILVER BRAZING MATERIAL

(71) Applicants: TANAKA KIKINZOKU KOGYO K.K., Tokyo (JP); TOKYO BRAZE CO., LTD., Tokyo (JP)

(72) Inventors: Takaomi Kishimoto, Tomioka (JP); Masahiro Takahashi, Tomioka (JP); Takashi Terui, Tomioka (JP); Kotaro Matsu, Tokyo (JP)

(73) Assignees: TANAKA KIKINZOKU KOGYO K.K., Tokyo (JP); TOKYO BRAZE CO., LTD., Tokyo (JP)

( * ) Notice: Subject to any disclaimer, the term of this patent is extended or adjusted under 35 U.S.C. 154(b) by 40 days.

(21) Appl. No.: 17/048,086

(22) PCT Filed: Oct. 24, 2018

(86) PCT No.: PCT/JP2018/039405
§ 371 (c)(1),
(2) Date: Oct. 15, 2020

(87) PCT Pub. No.: WO2019/207823
PCT Pub. Date: Oct. 31, 2019

(65) Prior Publication Data
US 2021/0146486 A1 May 20, 2021

(30) Foreign Application Priority Data

Apr. 23, 2018 (JP) .............................. JP2018-082005

(51) Int. Cl.
*B23K 35/30* (2006.01)
*B23K 1/00* (2006.01)
*B23K 1/19* (2006.01)
*B23K 101/20* (2006.01)
*B23K 103/12* (2006.01)
*B23K 1/008* (2006.01)
*B23K 31/02* (2006.01)

(52) U.S. Cl.
CPC .......... *B23K 35/302* (2013.01); *B23K 1/0008* (2013.01); *B23K 1/008* (2013.01); *B23K 1/19* (2013.01); *B23K 31/025* (2013.01); *B23K 2101/20* (2018.08); *B23K 2103/12* (2018.08)

(58) Field of Classification Search
None
See application file for complete search history.

(56) References Cited

U.S. PATENT DOCUMENTS

| 2011/0076183 A1* | 3/2011 | Taniguchi | H01L 23/10 |
| | | | 420/507 |
| 2016/0158898 A1* | 6/2016 | Wiehl | B23K 35/28 |
| | | | 148/528 |
| 2017/0368641 A1* | 12/2017 | Wiehl | C22C 30/04 |

FOREIGN PATENT DOCUMENTS

| CN | 1404957 | A | * | 3/2003 | |
| CN | 103909361 | A | | 7/2014 | |
| GB | 1 532 840 | A | | 11/1978 | |
| GB | 1532840 | A | * | 11/1978 | ......... B23K 35/3006 |
| JP | S48-34051 | A | | 5/1973 | |
| JP | S52-126660 | A | | 10/1977 | |
| JP | S63-154290 | A | | 6/1988 | |
| JP | H01-313198 | A | | 12/1989 | |
| JP | 2001-087889 | A | | 4/2001 | |
| JP | 2001-121288 | A | | 5/2001 | |

OTHER PUBLICATIONS

Machine translation of Li et al. CN 1404957A (Year: 2003).*
International Searching Authority, "International Search Report," issued in connection with International Patent Application No. PCT/JP2018/039405, dated Dec. 25, 2018.
International Searching Authority, "Written Opinion," issued in connection with International Patent Application No. PCT/JP2018/039405, dated Dec. 25, 2018.
Extended European Search Report dated Dec. 15, 2020 for corresponding European Patent Application No. 18916750.5.
Yamaya et al: "Silver solder"; retrieved from Chemical Database accession No. 84-110171; Apr. 19, 1976; XP002153245.

* cited by examiner

*Primary Examiner* — Elizabeth Collister
(74) *Attorney, Agent, or Firm* — Foley & Lardner LLP

(57) ABSTRACT

A silver brazing material containing silver, copper, zinc, manganese, nickel, and tin as indispensable constituent elements. The silver brazing material includes 35 mass % or more and 45 mass % or less silver, 18 mass % or more and 28 mass % or less zinc, 2 mass % or more and 6 mass % or less manganese, 1.5 mass % or more and 6 mass % or less nickel, and 0.5 mass % or more and 5 mass % or less tin, with the balance being copper impurities. Within these compositional ranges, a predetermined relation is set between the manganese content and the nickel content, whereby the silver brazing material can be provided with excellent characteristics also in terms of processability or wettability. In the silver brazing material of the present invention, the silver content is reduced, and also melting point reduction and the narrowing of the temperature difference between solidus temperature and liquidus temperature are attempted.

7 Claims, No Drawings

SILVER BRAZING MATERIAL AND JOINING METHOD USING THE SILVER BRAZING MATERIAL

RELATED APPLICATIONS

The present application claims priority under 37 U.S.C. § 371 to International Patent Application No. PCT/JP2018/039405, filed Oct. 24, 2018, which claims priority to and the benefit of Japanese Patent Application No. 2018-082005, filed on Apr. 23, 2018. The contents of these applications are hereby incorporated by reference in their entireties.

TECHNICAL FIELD

The present invention relates to a silver brazing material. Specifically, the present invention relates to a silver brazing material in which the silver content is reduced, also melting point reduction is attempted, and, at the same time, the temperature difference between solidus and liquidus is small; and also to a joining method using the silver brazing material.

BACKGROUND ART

A silver brazing material has been conventionally used for the joining of copper and copper alloys such as brass, joining of tool materials, or joining of different kinds of metal materials. A silver brazing material contains a silver-copper-based alloy (Ag—Cu-based alloy) as a basic component, and additive elements, such as zinc and tin, are added thereto. Silver brazing materials of various compositions are known.

Then, as requirements for silver brazing materials, the reduction of the silver amount (silver reduction) and the reduction of the melting point (melting point reduction) can be mentioned. Silver is a metal belonging to noble metals. Thus, it has been demanded to reduce the ground metal cost by silver reduction, thereby suppressing the material cost of the brazing material. In addition, the reduction of the melting point of a silver brazing material contributes to lowering the working temperature, thus also leading to the suppression of the energy cost for braze-joining.

In addition, the melting point of a brazing material may also affect the quality of the joint. With respect to the relation between the melting point of a silver brazing material and the joint quality, for example, affects ferrous materials, such as carbon steel, can be mentioned. Carbon steel has a transformation point (A1) near 730° C. Therefore, when joining is performed at a temperature exceeding this temperature, transformation occurs in the materials to be joined, causing a concern about the quality loss of the joint due to changes in the material characteristics, etc. Thus, the reducing the melting point of a brazing material has been an important requirement.

Further, reducing the melting point of a brazing material is also effective in terms of suppressing the loss of joint quality attributable to the thermal expansion difference between materials to be joined. A silver brazing material is also useful in the joining of different kinds of materials. However, in that case, it is preferable to join the material with thermal expansion difference taken into consideration. As a result of a decrease in the working temperature due to the lowered temperature of a brazing material, the influence of the thermal expansion difference between materials to be joined can be reduced, and the joint quality can be ensured.

Usually, when the silver content of a silver brazing material is reduced, the melting point tends to increase. Thus, in many of related arts in response to this requirement, together with the reduction of the silver content, the kinds and contents of other constituent elements are adjusted to control the melting point. For example, Patent Document 1 discloses a silver brazing material having a melting point (i.e. solidus temperature) of 705° C. or less, in which the silver amount is made 35 mass % or less, and also a relatively large amount of zinc and trace amounts of manganese and nickel are added. In addition, Patent Document 2 teaches an attempt to reduce of the working temperature with a silver brazing material, which contains silver in an amount of 45 mass % or more and 75 mass % or less and has added thereto zinc, gallium, tin and/or indium, manganese, etc.

RELATED ART DOCUMENT

Patent Documents

Patent Document 1: JP 1-313198 A
Patent Document 2: JP 2001-87889 A

SUMMARY OF THE INVENTION

Problems to be Solved by the Invention

With respect to the conventional silver brazing materials described above, the silver brazing material described in Patent Document 1 achieves clear results in terms of silver reduction. In addition, the material also seems to be somewhat effective in melting point reduction. However, this silver brazing material is problematic in that the temperature difference between solidus temperature and liquidus temperature is as relatively large as more than 50° C. In a joining step by use of a brazing material, it is preferable that the melting point at which the brazing material starts to melt (solidus temperature) is low, and it is preferable that the temperature difference between solidus temperature and liquidus temperature is small. When the temperature difference is large, the brazing material undergoes liquation, resulting in a significant decrease in workability. Therefore, it is generally believed to be preferable that the temperature difference between solidus temperature and liquidus temperature is 50° C. or less.

It seems that the silver brazing material of Patent Document 2 also focuses only on the melting point, that is, the reduction of the working temperature, and does not study the temperature difference between solidus temperature and liquidus temperature. Further, in the silver brazing material of Patent Document 2, the silver content is specified to be 45 mass % or more, and it must be said that the description is insufficient for the purpose of silver reduction.

In addition, processability is key to silver brazing materials when mode of use is taken into consideration. This is because a brazing material is used in a state of being processed according to the shape of materials to be joined or the form of joining. A silver brazing material that is difficult to plastically process and has poor processability leads to increased processing cost. Thus, even if silver is reduced, its effect is impaired. Then, as a characteristic important not only to silver brazing materials but also to general joining materials referred to as brazing materials, wettability can be mentioned. In this respect, although study examples about silver brazing materials made heretofore are highly concerned with silver reduction and melting point reduction as described above, there are few specific studies on overall characteristic improvement focusing on processability or wettability.

The present invention has been accomplished against the above background, and provides a silver brazing material in which the reduction of the silver content is attempted, also the melting point is low, and, at the same time, the temperature difference between solidus temperature and liquidus temperature is small. As specific standards, a silver brazing material in which the melting point (solidus temperature) is 705° C. or less, and the temperature difference between solidus temperature and liquidus temperature is 50° C. or less, is disclosed. Further, in addition to the above characteristics, a silver brazing material having excellent characteristics also in terms of processability and wettability is provided.

Means for Solving the Problems

The present inventors have reexamined the actions of various additive elements, and also attempted to optimize them. As a result, they have found that when the silver content is moderately reduced, and also manganese and nickel are added simultaneously in appropriate amounts, the solidus temperature can be reduced, and, at the same time, the temperature difference between solidus temperature and liquidus temperature could be narrowed.

Then, according to the study by the present inventors, it has been confirmed that the simultaneous addition of manganese and nickel leads to improvement in the processability of the silver brazing material, and, in addition, wettability can also be ensured. The present inventors have conducted extensive research and attempted to optimize the suitable ranges of the manganese and nickel contents and the relation between the contents, thereby arriving at a silver brazing material capable of solving the above problems.

That is, the present invention is drawn to a silver brazing material including 35 mass % or more and 45 mass % or less silver, 18 mass % or more and 28 mass % or less zinc, 2 mass % or more and 6 mass % or less manganese, 1.5 mass % or more and 6 mass % or less nickel, and 0.5 mass % or more and 5 mass % or less tin, with the balance being copper and unavoidable impurities. The silver brazing material has a manganese content ($C_{Mn}$) and a nickel content ($C_{Ni}$) represented by the following formula:

$$C_{Mn}/C_{Ni} \geq 0.9 \quad \text{[Equation 1]}$$

As understood from the above description, in the silver brazing material according to the present invention, the kinds of constituent elements themselves are within known ranges. However, the present invention is characterized in that the content of manganese and the content of nickel are both relatively increased.

As the efficacy of the addition of manganese and nickel to a silver brazing material, it has been known that they are each a metal that tends to increase the melting point of a silver brazing material. Therefore, in the conventional composition designing of a silver brazing material, it has been believed that the contents of manganese and nickel should be suppressed. However, the study by the present inventors confirmed that a silver brazing material having a silver content reduced by a predetermined amount showed a decrease of the melting point when manganese and nickel are added simultaneously within appropriate ranges.

The reason why the addition of both manganese and nickel has the action of reducing the melting point of a silver brazing material within a certain silver content range is not necessarily clear. As its reason, the present inventors presume that the action is attributable to the generation of an intermetallic compound of manganese and nickel (MnNi compound) as described below. Then, the present inventors have considered that a MnNi compound adjusts the melting point of a brazing material and also influences on processability and wettability.

The present invention is based on the above findings, focuses on the contents of nickel and manganese, and clearly specifies the optimal contents of other constituent elements. Hereinafter, the alloy composition of the silver brazing material according to the present invention will be described.

A. Material Composition of Silver Brazing Material According to the Present Invention Silver: 35 Mass % or More and 45 Mass % or Less Silver is a main constituent element of the silver brazing material, and controls its melting point and also influences on the strength or processability. In the present invention, the silver content is specified to be 35 mass % or more and 45 mass % or less. This range is located between the silver amount of the silver brazing material of Patent Document 1 described above (1 mass % or more and 35 mass % or less) and the silver amount of the silver brazing material of Patent Document 2 (45 mass % or more and 75 mass % or less), and moderate silver reduction is attempted.

When the silver content is less than 35 mass %, the temperature difference between solidus temperature and liquidus temperature tends to increase. Further, a low silver content may result in a fragile material, leading to low processability. Meanwhile, when the silver content is more than 45 mass %, silver reduction will be less significant. In addition, silver tends to dissolve manganese in a brazing material, and therefore, an excessive silver content may diminish the action of manganese addition. From this, the present invention specifies the silver content to be 35 mass % or more and 45 mass % or less. The silver content is more preferably 38 mass % or more and 42 mass % or less.

Zinc: 18 Mass % or More and 28 Mass % or Less

Zinc is an indispensable additive element having the action of adjusting the melting point of the silver brazing material. When zinc is less than 18 mass %, the temperature difference between solidus temperature and liquidus temperature tends to increase. In addition, a zinc content of more than 28 mass % leads to a problem with processability deterioration. In addition, a large amount of fume is generated during brazing, leading to problems with contamination of the heating furnace and the like. From above, the content of zinc has been specified to be 18 mass % or more and 28 mass % or less. Incidentally, the content of zinc is more preferably 21 mass % or more and 25 mass % or less.

Manganese: 2 Mass % or More and 6 Mass % or Less

Manganese is an indispensable additive element characteristic in the present invention, together with the below-described nickel. As described above, conventionally, manganese and nickel have been recognized as additive elements that increase the melting point of a silver brazing material, and there has been a tendency of avoiding the addition thereof in large amounts. In the present invention, manganese and nickel are added simultaneously in appropriate amounts, thereby achieving melting point reduction and processability improvement.

The reason why simultaneous addition of manganese and nickel is indispensable in the present invention as described above is that a MnNi compound is to be generated. Although its mechanism is not clear, a MnNi compound has the action of promoting the reduction of the melting point of a brazing material and the narrowing of the temperature difference between solidus temperature and liquidus temperature. In addition, the presence of a MnNi compound can also exert improving effects on the processability and wettability of the silver brazing material. According to the study by the present inventors, these effects of a MnNi compound are developed when the silver content of the silver brazing material is moderately reduced. And, when the silver content is too low, such effects disappear.

In consideration of the actions of a MnNi compound as described above, the content of manganese in the present invention is specified to be 2 mass % or more and 6 mass % or less. When the content is less than 2 mass %, the generation of a MnNi compound is expected to be difficult. In addition, in the case of excessive manganese exceeding 6 mass %, an increase in the melting point and deterioration of wettability are concerns. Further, because manganese is a metal that is easily oxidized, when its content is high, it may be oxidized during brazing, thereby inhibiting joining.

Nickel: 1.5 Mass % or More and 6 Mass % or Less

Similarly to manganese, nickel is an indispensable additive element characteristic in the present invention. Then, in consideration of the actions of the generation of a MnNi compound described above, the content of nickel in the present invention is specified to be 1.5 mass % or more and 6 mass % or less. When the content is less than 1.5 mass %, the generation of a MnNi compound is expected to be difficult, and its effects may not be enjoyed. In addition, when excessive nickel exceeding 6 mass % is added, an increase in the melting point is a concern. In addition, when nickel is excessively added together with manganese, wettability may deteriorate.

Relation Between Manganese Content and Nickel Content

As stated up to here, the silver brazing material according to the present invention requires manganese and nickel as indispensable additive elements, and the content of each element is set within a certain range. According to the present inventors, the manganese content and nickel content described above mainly controls the melting point and processability of the silver brazing material. That is, when the contents of other constituent elements, such as silver, and the contents of manganese and nickel are within specified ranges, a low melting point (liquidus temperature of 705° C. or less) and the narrowing of the temperature difference between solidus temperature and liquidus temperature (50° C. or less) are achieved, and processability can also be ensured.

However, with respect to the ensuring of wettability, which is a characteristic important to a brazing material, the individual adjustment of the content of each of the constituent elements, including manganese and nickel, alone is insufficient. According to the study by the present inventors, for improvement in wettability, it is necessary to appropriately adjust the manganese content and the nickel content and also to specify the relation between them. Specifically, when the manganese content is expressed as $C_{Mn}$, and the nickel content as $C_{Ni}$, the following relational formula needs to be satisfied.

$$C_{Mn}/C_{Ni} \geq 0.9 \quad \text{[Equation 2]}$$

It is considered that the above relation is required between a manganese content ($C_{Mn}$) and a nickel content ($C_{Ni}$) for the purpose of allowing the added manganese and nickel each to react neither too much nor too little, thereby generating an effective MnNi compound. As a MnNi compound presumed to be effective in the present invention, an intermetallic compound (η phase) in which the weight ratio between manganese and nickel is close to 1:1, with the proportion of nickel being slightly higher, is presumed to be effective. The above relational formula is in consideration of the structure of such a MnNi compound. Then, even when a silver brazing material has added thereto manganese and nickel, in the case where their contents deviate from the above relational formula, the resulting brazing material tends to have poor wettability.

Tin: 0.5 Mass % or More and 5 Mass % or Less

Tin is an additive element for adjusting the melting point of the silver brazing material. However, tin has the action of reducing the processability of the brazing material, and thus its content is limited. That is, the addition of tin exceeding 5 mass % deteriorates the processability of the brazing material, making plastic processing difficult. In addition, although the addition of tin can greatly contribute to the reduction of the solidus temperature of the silver brazing material, the action of reducing the liquidus temperature is weak. Therefore, the excessive addition of tin leads to the widening of the temperature difference. Thus, in the present invention, the content of tin is specified to be 0.5 mass % or more and 5 mass % or less. The content of tin is more preferably 1 mass % or more and 3 mass % or less.

Copper and Unavoidable Impurities

Other than silver and the additive elements described above, the balance is copper and unavoidable impurities. Copper is an indispensable constituent element of the silver brazing material together with silver. In addition, the brazing material according to the present invention allows the inclusion of unavoidable impurities. Examples of unavoidable impurities include aluminum (Al), bismuth (Bi), cadmium (Cd), phosphorus (P), lead (Pb), silicon (Si), and iron (Fe). These unavoidable impurities are each preferably specified to be 0 mass % or more and 0.15 mass % or less. Of the above impurities, in the field of silver brazing materials, cadmium and lead are conventionally avoided as harmful elements. Also in the present invention, the contents of these harmful elements are preferably reduced, and it is more preferable that cadmium is 0 mass % or more and 0.010 mass % or less, while lead is 0 mass % or more and 0.025 mass % or less.

B. Method for Producing Silver Brazing Material According to the Present Invention Similarly to conventional brazing materials, the silver brazing material according to the present invention described above can be produced by a melt-casting method. In melt-casting, a molten metal of a silver alloy that has been composition-adjusted to have a composition equivalent to a silver brazing material to be produced is cast, and the molten metal is cooled and solidified to produce an alloy block. For melt-casting, it is possible to apply ingot casting, in which an alloy ingot is melt-cast in a mold. In addition, a continuous casting method and a semi-continuous casting method are also applicable.

The melt-cast alloy material can be suitably plastically processed into a desired shape to give a silver brazing material. Examples of plastic processing include, but are not limited to, rolling, forging, extrusion, drawing, wire drawing, and pressing.

C. Joining Method by Use of Silver Brazing Material According to the Present Invention The joining method by use of a silver brazing material according to the present invention is basically the same as the conventional joining method by use of a silver brazing material. That is, a silver brazing material is placed at a brazing site of a member to be joined, and the silver brazing material is heated and melted to form a braze joint. Here, the silver brazing material according to the present invention exhibits a melting point (solidus temperature) of 705° C. or less. Therefore, during brazing, the heating temperature of the silver brazing material, which serves as the working temperature, can be 725° C. or more and 825° C. In the silver brazing material according to the present invention, the temperature difference between solidus temperature and liquidus temperature is 50° C. or less, and, therefore, by employing such a heating temperature, a brazing work with excellent workability is possible.

Incidentally, in braze-joining by use of a silver brazing material, it is preferable that the brazing material is covered with a flux, and the brazing material is heated. This is for the purpose of suppressing the oxidation of the brazing material. As a flux, a known flux applicable to a silver brazing material can be used. Incidentally, a brazing material can be heated through materials to be joined.

D. Joined Article by Use of Silver Brazing Material According to the Present Invention The silver brazing material according to the present invention is suitable for the production of a joined article including, as a constituent component, copper, a copper alloy such as brass, carbon steel, tool steel, stainless steel, or the like. Effectiveness is provided when at least one of materials to be joined is the above material. In addition, the silver brazing material according to the present invention is also suitable for braze-joining between different kinds of metal materials. As a joined article produced by the present invention, a tool, especially a cutting tool, can be mentioned as a particularly useful example.

Advantageous Effects of the Invention

As described above, the silver brazing material according to the present invention is a silver brazing material that meets conventional requirements, that is, silver reduction and melting point reduction, and also achieves the narrowing of the temperature difference between solidus temperature and liquidus temperature. This silver brazing material exerts its effect because of the silver content set within a predetermined range and also of the addition of manganese and nickel both within appropriate ranges. In addition, with respect to the contents of manganese and nickel, by setting them more strictly, a silver brazing material that is also excellent in terms of processability and wettability can be obtained.

The silver brazing material according to the present invention is suitable for braze-joining of copper or a copper alloy, braze-joining of metal materials for tools (ferrous materials, etc.) or steel such as stainless steel, and also braze-joining between different kinds of metal materials. In brazing by use of the silver brazing material according to the present invention, the heating temperature that serves as the working temperature can be lowered, whereby an efficient brazing work can be performed without concerns about the liquation and the like.

DESCRIPTION OF EMBODIMENTS

Hereinafter, an embodiment of the present invention will be described. In this embodiment, silver brazing materials (Ag—Cu-based alloys) of various compositions were produced by melt-casting, and their solidus temperatures and liquidus temperatures were measured. Then, each brazing material was evaluated for processability and wettability.

In the production of evaluation samples of various silver brazing materials, first, high-purity materials of the constituent metals were mixed, and melted and cast in air, thereby producing a rod-like alloy ingot (18 mm in diameter). Next, the rod-like alloy ingot was sliced to cut out a 3-mm-thick sample. Then, the sample was rolled and cut into a chip-like sample. This sample was used for chemical analysis and X-ray fluorescence spectrometry to perform detailed composition analysis. In addition, from the cut-out sample, 0.1 g of a sample for thermometric analysis was further cut out, and the solidus temperature and liquidus temperature were measured.

The measurement of solidus temperature and liquidus temperature was performed by differential scanning calorimetry (DSC). In this embodiment, measurement was performed by use of DSC3300 manufactured by Bruker AXS as the measurement device, in an Ar atmosphere, at temperature rise rate of 20° C./min, and in a measurement temperature range of room temperature to 1250° C. In the measured chart, tangents were drawn at relatively stable positions near the height of about 40 to 50% of the peak height of the peak during temperature rise (rising side and falling side), and also a tangent along the baseline was drawn. Then, the intersection between the tangent drawn on the rising side of the peak and the tangent of the baseline was defined as the solidus temperature (SL), while the intersection between the tangent drawn on the falling side of the peak and the tangent of the baseline was defined as the liquidus temperature (LL). In addition, based on the measured solidus temperature and liquidus temperature, the difference between the two was calculated.

Table 1 shows the composition, the melting point (solidus temperature), and the liquidus temperature of each silver brazing materials of various compositions produced in this embodiment, together with the results of processability evaluation. Incidentally, in this embodiment, a silver brazing material of composition equivalent to "BAg-7", which is a conventionally well-known silver brazing material, was produced and studied as "Conventional Example."

TABLE 1

| | Composition (mass %) | | | | | | Melting point (° C.) | | |
|---|---|---|---|---|---|---|---|---|---|
| No. | Ag | Zn | Mn | Ni | Sn | Cu | Solidus | Liquidus | Temperature difference |
| 1 | 40.5 | 22.7 | 4.7 | 4.2 | 1.9 | Balance | 656 | 672 | 16 |
| 2 | 40.6 | 23.1 | 5.4 | 2.0 | 1.8 | | 670 | 705 | 35 |
| 3 | 35.8 | 27.6 | 4.1 | 4.2 | 0.9 | | 673 | 691 | 18 |
| 4 | 44.8 | 18.5 | 4.4 | 4.4 | 2.0 | | 659 | 701 | 42 |
| 5 | 40.3 | 24.8 | 4.6 | 1.9 | 4.9 | | 638 | 685 | 47 |
| 6 | 40.0 | 23.0 | 5.1 | 3.8 | 4.7 | | 652 | 672 | 20 |

TABLE 1-continued

| | Composition (mass %) | | | | | Melting point (° C.) | | Temperature |
|---|---|---|---|---|---|---|---|---|
| No. | Ag | Zn | Mn | Ni | Sn | Cu | Solidus | Liquidus | difference |
| 7 | 39.7 | 24.7 | 5.2 | 3.8 | 1.6 | | 662 | 679 | 17 |
| 8 | 40.2 | 20.5 | 4.6 | 3.8 | 1.7 | | 654 | 680 | 26 |
| 9 | 40.4 | 19.2 | 4.9 | 4.1 | 1.9 | | 651 | 692 | 41 |
| 10 | 40.3 | 20.5 | 5.3 | 5.8 | 1.8 | | 657 | 691 | 34 |
| 11 | 40.5 | 22.7 | 4.7 | 4.2 | 1.9 | | 656 | 672 | 16 |
| 12 | 40.2 | 26.9 | 2.7 | 2.1 | 1.0 | | 668 | 691 | 23 |
| 13 | 40.3 | 22.8 | 4.7 | 4.1 | 4.1 | | 659 | 678 | 19 |
| 14 | 40.6 | 22.7 | 1.5 | 6.0 | 2.0 | | 650 | 700 | 50 |
| 15 | 40.8 | 22.7 | 6.4 | 7.2 | 1.9 | | 672 | 697 | 25 |
| 16 | 40.5 | 27.7 | 0.3 | 0.5 | 2.0 | | 662 | 728 | 66 |
| 17 | 41.8 | 20.0 | 1.4 | 4.2 | — | | 696 | 720 | 24 |
| 18 | 40.0 | 28.0 | — | 2.0 | — | | 670 | 780 | 110 |
| 19 | 40.0 | 28.0 | 3.0 | — | — | | 675 | 720 | 45 |
| 20 | 25.0 | 33.0 | 2.0 | 2.0 | — | | 705 | 800 | 95 |
| 21 | 50.2 | 21.7 | 5.3 | 3.8 | 1.8 | | 655 | 750 | 95 |
| 22 | 43.6 | 17.1 | 3.8 | 2.0 | 2.0 | | 645 | 699 | 54 |
| 23 | 30.8 | 30.8 | 3.7 | 3.2 | 7.3 | | 617 | 710 | 93 |
| Conventional Example | 56.2 | 15.6 | — | — | 5.1 | | 620 | 650 | 30 |

As a result of studying the silver brazing materials of No. 1 to No. 15 in Table 1, it can be seen that addition of both manganese and nickel seems to be able to reduce melting point (i.e. liquidus temperature of 705° C. or less) and narrow the temperature difference between solidus temperature and liquidus temperature (50° C. or less).

The brazing material of No. 16 is a silver brazing material close to the above silver brazing material described in Patent Document 1. In this silver brazing material, although manganese and nickel were added, because their amounts were too small, their effects were not exerted. As a result, the liquidus temperature was high, and the narrowing of the temperature difference between solidus temperature and liquidus temperature was also insufficient.

The silver brazing material of No. 17 had a small amount of manganese and contained no tin, and thus the melting point was not satisfactory. The silver brazing materials of Nos. 18 and 19, to which manganese and nickel had not been added simultaneously, had high liquidus temperatures and were unsuitable. In addition, these silver brazing materials, to which tin had not been added, showed relatively high solidus temperatures. In the case where tin is added to such a material, the temperature difference from the liquidus temperature is expected to increase due to a decrease in the solidus temperature. The silver brazing material of No. 20 contains too little of silver, thereby the temperature difference between solidus temperature and liquidus temperature is large and the liquidus temperature is also high. Meanwhile, the silver brazing material of No. 21 contains too much of silver, and silver reduction is less significant. Further, the temperature difference between solidus temperature and liquidus temperature is also large. The silver brazing material of No. 22 contain small amount of zinc, so that the temperature difference between solidus temperature and liquidus temperature is more than 50° C.

Then, the silver brazing material of No. 23 showed remarkably lowered melting point (solidus temperature) due to excessive addition of tin, the temperature difference from the solidus increased. In the present invention, although the addition of tin is indispensable, tin is believed to be an auxiliary additive element for melting point adjustment.

Next, out of the silver brazing materials according to this embodiment described above, which satisfied conditions related to the melting point (No. 1 to No. 15 and Conventional Example), namely satisfied such criteria as that the liquidus temperature is 705° C. or less and the temperature difference between solidus temperature and liquidus temperature is 50° C. or less, some brazing materials (Nos. 1 to 4, 10, 14, 15, and Conventional Example) were subjected to processability and wettability evaluation tests.

In the processability evaluation method, processability was judged from the possibility of plastic processing at the time when, in the production process of each of the silver brazing materials described above, a sample cut out from a rod-shaped ingot after melt-casting was rolled in a rolling mill. Rolling was performed at room temperature at a processing ratio of 10%. When processing was possible without cracks or the like, processability was rated as good (⊙), while when although small cracks were seen at the end of the rolled material, etc., processing was possible, processability was rated as fair (○). Meanwhile, when notable cracks were formed in the rolled material, or rolling was not possible due to fracture, processability was rated as poor (x).

In the wettability evaluation method, from each of the samples of various silver brazing materials cut out from rod-shaped ingots, 0.1 g of a silver brazing material for wettability evaluation was cut out.

Next, three kinds of test metal plates made of carbon steel, a copper, and brass (dimension: 40 mm wide×50 mm long×1.2 mm thick) were prepared. Then, the brazing material was mounted on each metal plate, and, in order to set the heating time in the evaluation test, the brazing material in this state was heated with a burner from the back of the metal plate. The time until the silver brazing material reached 750° C. was measured and recorded.

In the wettability evaluation test, after the above preparation, and after mounting the brazing material on each metal plate, for the prevention of oxidation during heating, a flux (TB610 manufactured by Tokyo Braze Co., Ltd.) was applied to the silver brazing material and the surface of the metal plate. Then, the metal plate was heated with a burner from the back to melt the brazing material. Burner heating was performed only for the time measured above and stopped after the passage of time, and the sample was allowed to cool in air. After cooling, the flux was washed, and the area of wetting/spreading of the molten/solidified silver brazing material was measured. As a method for area measurement, the lengths in two directions, width and length, of the area of the silver brazing material that wetted and spread were measured. Then, with respect to each length, the area of a hypothetical circle having the measured length as its diameter was determined, and the average of two determined areas was defined as the wetting/spreading area. Based on this method, each silver brazing material was tested on each metal plate three times, and the average was defined as the wetting/spreading area of the silver brazing material on the metal plate.

Wettability was evaluated based on the wetting/spreading area of each silver brazing material measured above. First, the wettability on each metal plate was evaluated as follows relative to the wetting/spreading area of the silver brazing material.

Carbon steel: 150 mm$^2$ or more was rated as "excellent (⊙)", 70 mm$^2$ or more and less than 150 mm$^2$ was rated as "fair (○)", and less than 70 mm$^2$ was rated as "poor (x)."

Copper: 150 mm$^2$ or more was rated as "excellent (⊙)", 70 mm$^2$ or more and less than 150 mm$^2$ was rated as "fair (○)", and less than 70 mm$^2$ was rated as "poor (x)."

Brass: 150 mm$^2$ or more was rated as "excellent (⊙)", 60 mm$^2$ or more and less than 150 mm$^2$ was rated as "fair (○)", and less than 60 mm$^2$ was rated as "poor (x)."

Then, of the evaluation results for the above three kinds of metal plates, when there was at least one "excellent (⊙)", an overall wettability evaluation "excellent (⊙)" was given, when there was at least one "poor (x)", an overall wettability evaluation "poor (x)" was given, and in other cases, an overall wettability evaluation "fair (○)" was given.

The above processability and wettability evaluation results are shown in Table 2.

is believed that the wettability was insufficient. In the case of this silver brazing material, the wettability on carbon steel and brass was "fair (○)." In consideration of these results together with the composition of the silver brazing material of No. 14, with respect to composition, it was considered to be preferable to suppress the upper limits of the manganese content and the nickel content to about 6.0% of No. 14, and also make the value of their ratio a little higher than 0.89. With reference to the results of the silver brazing material of No. 10, it is believed to be suitable that the manganese content/nickel content ratio is 0.9 or more. In the present invention, from the above consideration, the upper limits of the manganese content and the nickel content, as well as their ratio, were set.

Incidentally, the silver brazing material (BAg-7) of the conventional example similarly satisfied the standards related to the melting point, and the wettability was also excellent. From the viewpoint of reducing the melting point and ensuring workability while attempting silver reduction, the usefulness of the present invention that allows for the reduction of the silver content by 10 mass % or more is clear. In addition, the silver brazing material of the conventional example was inferior in terms of processability.

INDUSTRIAL APPLICABILITY

As described above, the silver brazing material according to the present invention is a brazing material capable of achieving both silver reduction and improvement of the characteristics as a brazing material. The present invention is drawn to a silver brazing material that meets a conventional requirement for a silver brazing material, that is, melting point reduction, and also achieves the narrowing of the temperature difference between solidus temperature and liquidus temperature. In the silver brazing material of the present invention, the silver content is set within a predetermined range, and manganese and nickel are both added within appropriate ranges. At the same time, the relation

TABLE 2

| | Composition (mass %) | | | | | | Compositional ratio | | Wettability | | | |
|---|---|---|---|---|---|---|---|---|---|---|---|---|
| No. | Ag | Zn | Mn | Ni | Sn | Cu | $C_{Mn}/C_{Ni}$ | Processability | Low-carbon steel | Copper | Brass | Overall |
| 1 | 40.5 | 22.7 | 4.7 | 4.2 | 1.9 | Balance | 1.12 | ○ | ○ | ○ | ○ | ○ |
| 2 | 40.6 | 23.1 | 5.4 | 2.0 | 1.8 | | 2.77 | ○ | ⊙ | ⊙ | ○ | ⊙ |
| 3 | 35.8 | 27.6 | 4.1 | 4.2 | 0.9 | | 0.98 | ○ | ⊙ | ○ | ○ | ⊙ |
| 4 | 44.8 | 18.5 | 4.4 | 4.4 | 2.0 | | 0.99 | ○ | ○ | ○ | ○ | ○ |
| 10 | 40.3 | 20.5 | 5.3 | 5.8 | 1.8 | | 0.91 | ○ | ○ | ○ | ○ | ○ |
| 14 | 40.6 | 22.7 | 1.5 | 6.0 | 2.0 | | 0.25 | ○ | X | X | X | X |
| 15 | 40.8 | 22.7 | 6.4 | 7.2 | 1.9 | | 0.89 | ○ | ○ | X | ○ | X |
| Conventional Example | 56.2 | 15.6 | — | — | 5.1 | | — | X | ○ | ⊙ | ⊙ | ⊙ |

The silver brazing materials subjected to the evaluation test, except for the conventional example, contained all of the constituent elements of the silver brazing material according to the present invention (silver, zinc, manganese, nickel, tin, and copper). From the evaluation results shown in Table 2, the silver brazing material of No. 14 having a low manganese content/nickel content ratio ($C_{Mn}/C_{Ni}$) had poor wettability on all the materials evaluated herein, and was presumed to cause a huge obstacle to workability during brazing. In addition, in the silver brazing material of No. 15, from the fact that the manganese content and the nickel content were too high, and also they were out of balance, it between their contents is strictly set. As a result, a silver brazing material that satisfies the standards related to the melting point described above and also has excellent wettability can be obtained.

The silver brazing material according to the present invention is suitable for braze-joining of copper or a copper alloy, braze-joining of metal materials for tools (ferrous materials, etc.) or steel such as stainless steel, and also braze-joining between different kinds of metal materials. Brazing by use of the silver brazing material according to the present invention enables the heating temperature that serves as the working temperature to be lowered, whereby an efficient brazing work can be performed without concerns about the liquation and the like.

The invention claimed is:

1. A silver brazing material comprising 35 mass % or more and 45 mass % or less silver, 18 mass % or more and less than 25 mass % zinc, 2 mass % or more and 6 mass % or less manganese, 1.5 mass % or more and 6 mass % or less nickel, and 0.5 mass % or more and 5 mass % or less tin, with the balance being copper and unavoidable impurities, wherein the silver brazing material has a manganese content ($C_{Mn}$) and a nickel content ($C_{Ni}$) represented by the following formula:

$$C_{Mn}/C_{Ni} \geq 0.9 \qquad \text{[Equation 1]}$$

and wherein the contents of silver, copper, zinc, manganese, nickel, and tin are set to be within said ranges so that a temperature difference between solidus temperature and liquidus temperature of the material is 50° C. or less.

2. A joining method using the silver brazing material defined in claim 1, comprising the step of placing the silver brazing material at a brazing site of a member to be joined, and heating and melting the silver brazing material, wherein the silver brazing material is heated at a heating temperature of 725° C. or more and 825° C. or less.

3. A tool comprising two or more members joined through at least one joint, wherein said at least one joint includes the silver brazing material defined in claim 1.

4. The tool according to claim 3, wherein at least one of the members joined through a joint comprises any one of copper, copper alloys, carbon steel, tool steel, and stainless steel.

5. A tool comprising two or more members joined through at least one joint, wherein said at least one joint includes the silver brazing material defined in claim 1.

6. The silver brazing material according to claim 1, comprising 35 mass % or more and 45 mass % or less silver, 18 mass % or more and 24.8 mass % or less zinc, 2 mass % or more and 6 mass % or less manganese, 1.5 mass % or more and 6 mass % or less nickel, and 0.5 mass % or more and 5 mass % or less tin, with the balance being copper and unavoidable impurities.

7. The silver brazing material according to claim 1, comprising 35 mass % or more and 45 mass % or less silver, 18 mass % or more and 24.7 mass % or less zinc, 2 mass % or more and 6 mass % or less manganese, 1.5 mass % or more and 6 mass % or less nickel, and 0.5 mass % or more and 5 mass % or less tin, with the balance being copper and unavoidable impurities.

* * * * *